United States Patent [19]
Otomo et al.

[11] Patent Number: 5,900,994
[45] Date of Patent: May 4, 1999

[54] READOUT LENS

[75] Inventors: Ryoko Otomo; Akiko Ishii, both of Omiya, Japan

[73] Assignee: Fuji Photo Optical Co., Ltd., Saitama, Japan

[21] Appl. No.: 08/706,565

[22] Filed: Sep. 5, 1996

[30] Foreign Application Priority Data

Oct. 5, 1995 [JP] Japan .................... 7-284553

[51] Int. Cl.$^6$ ............................. G02B 17/00
[52] U.S. Cl. ............................................. 359/773
[58] Field of Search .................... 359/771, 772, 359/773, 733, 734, 753, 749, 745, 747, 754, 715

[56] References Cited

U.S. PATENT DOCUMENTS

| | | | |
|---|---|---|---|
| 2,446,402 | 8/1948 | Aklin | 359/773 |
| 4,303,313 | 12/1981 | Imai et al. | 359/747 |
| 4,368,956 | 1/1983 | Yamada et al. | 359/715 |
| 4,373,786 | 2/1983 | Yamada | 359/773 |
| 4,413,888 | 11/1983 | Sato | 359/773 |
| 4,443,069 | 4/1984 | Mihara | 359/773 |
| 4,477,155 | 10/1984 | Sato et al. | 359/773 |
| 4,606,607 | 8/1986 | Kurihara | 359/773 |
| 4,659,190 | 4/1987 | Mihara | 359/773 |
| 4,688,903 | 8/1987 | Fujita et al. | 359/773 |
| 4,767,201 | 8/1988 | Fujita et al. | 359/773 |
| 4,792,216 | 12/1988 | Kudo | 359/773 |

FOREIGN PATENT DOCUMENTS 7-104185 4/1995 Japan .

OTHER PUBLICATIONS

Jap.Pat.Public.No. 1-183614, Jul. 21, 1989, Japan (same as Japanese Patent No. 2-38925, Mar. 9, 1990).
Jap.Pat.Public.No. 61-6616 (A), Jan. 13, 1986, Japan (same as Japanese Patent No. 2-51485, Jul. 11, 1990).

*Primary Examiner*—Frank G. Font
*Assistant Examiner*—Michael P. Stafira
*Attorney, Agent, or Firm*—Ronald R. Snider

[57] ABSTRACT

In a four-sheet lens configuration composed of convex, concave, convex, and concave lenses, predetermined conditional expressions are satisfied so as to attain a compact size and a wider field angle in a lens system for reading out images, while correcting various kinds of aberration. Further, a bright lens system is obtained. Successively from the object side, a first lens ($L_1$) comprising a positive meniscus lens with a convex surface directed onto the object side, a second lens ($L_2$) comprising a biconcave lens, a third lens ($L_3$) comprising a biconvex lens, and a fourth lens ($L_4$) comprising a negative meniscus lens with a convex surface directed onto an imaging surface side are disposed, while the following conditional expressions (1) to (3) are satisfied:

$$0.87 < f(1/R_8 - 1/R_7) < 2.75 \quad (1)$$

$$0.23 < R_1/f < 0.38 \quad (2)$$

$$1.08 < |N_4 \cdot f_4|/f < 3.70 \quad (3)$$

2 Claims, 17 Drawing Sheets

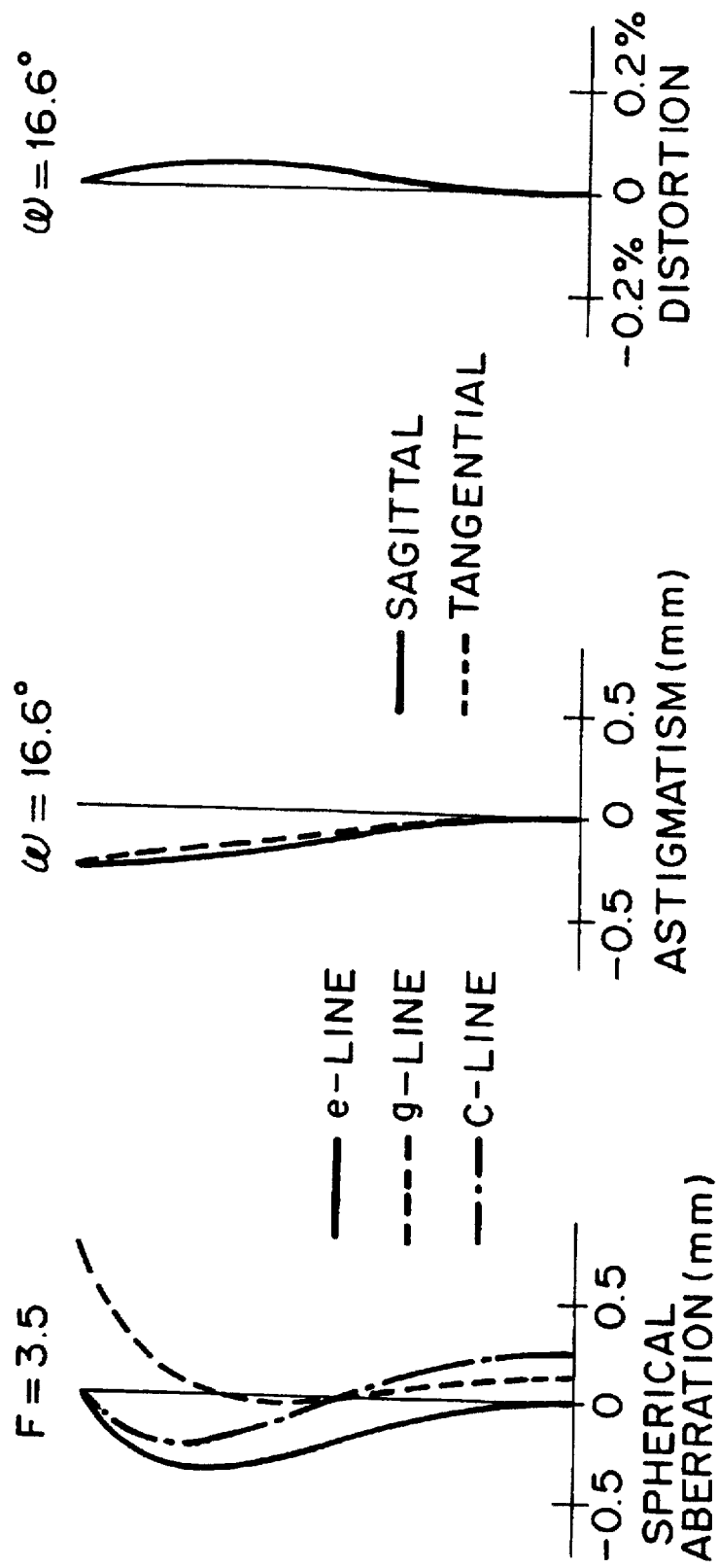

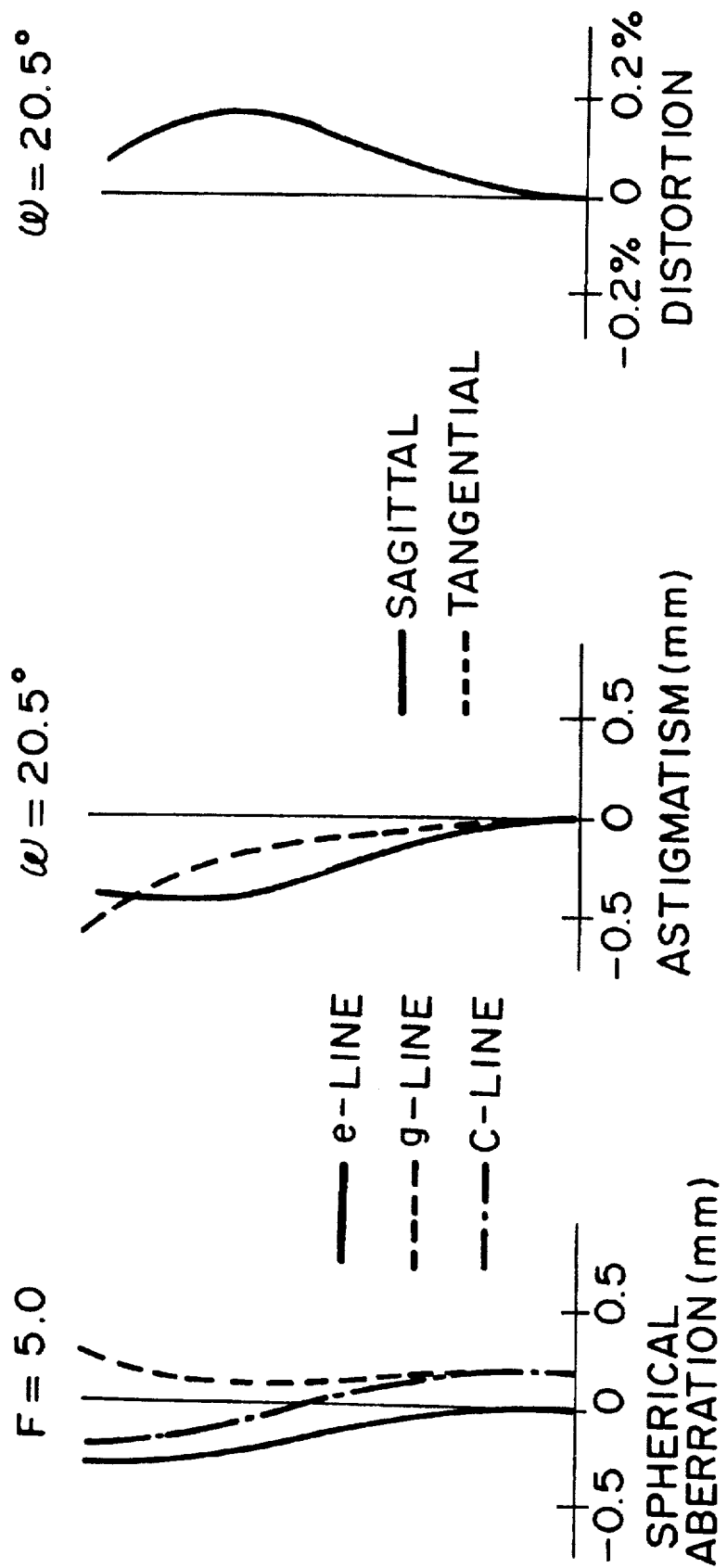

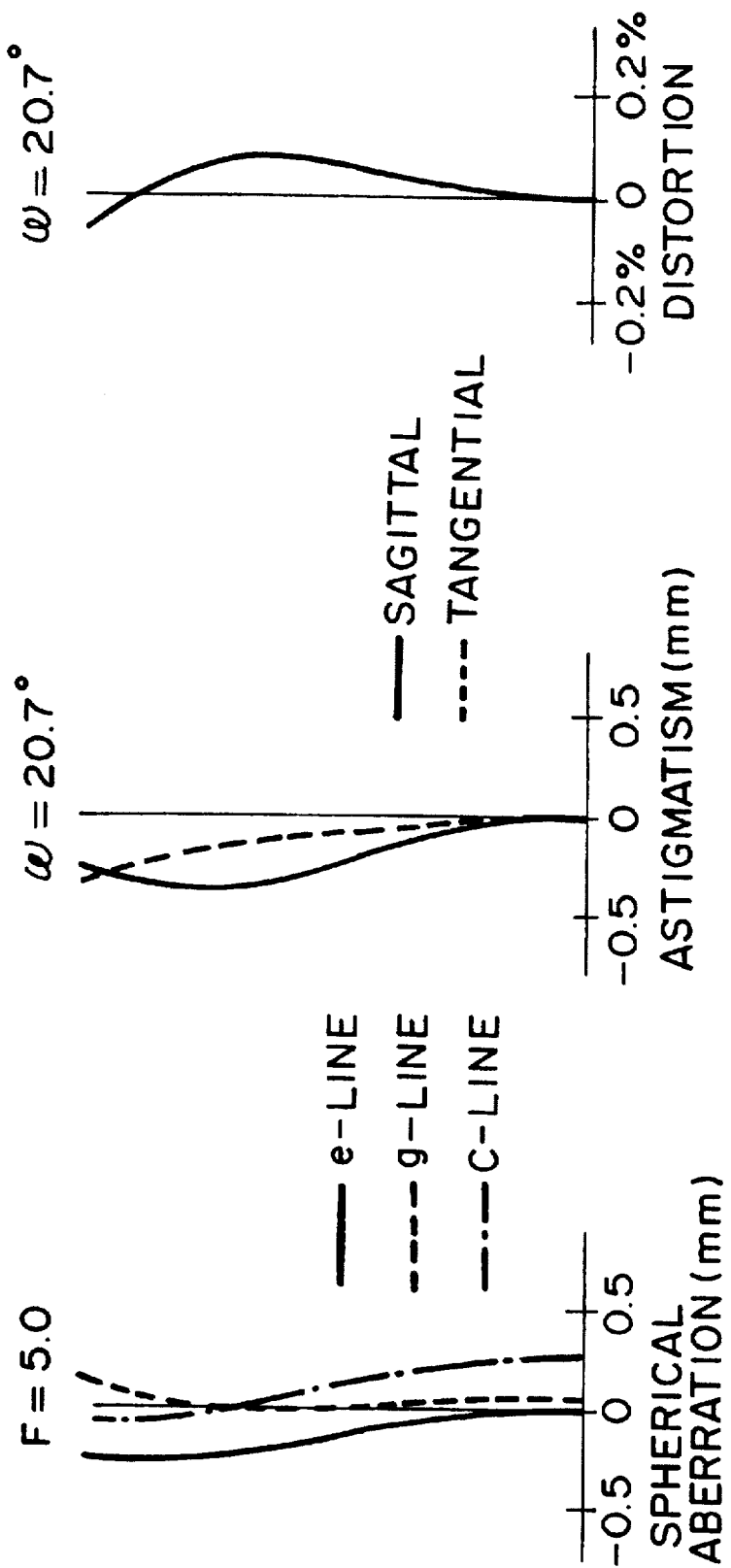

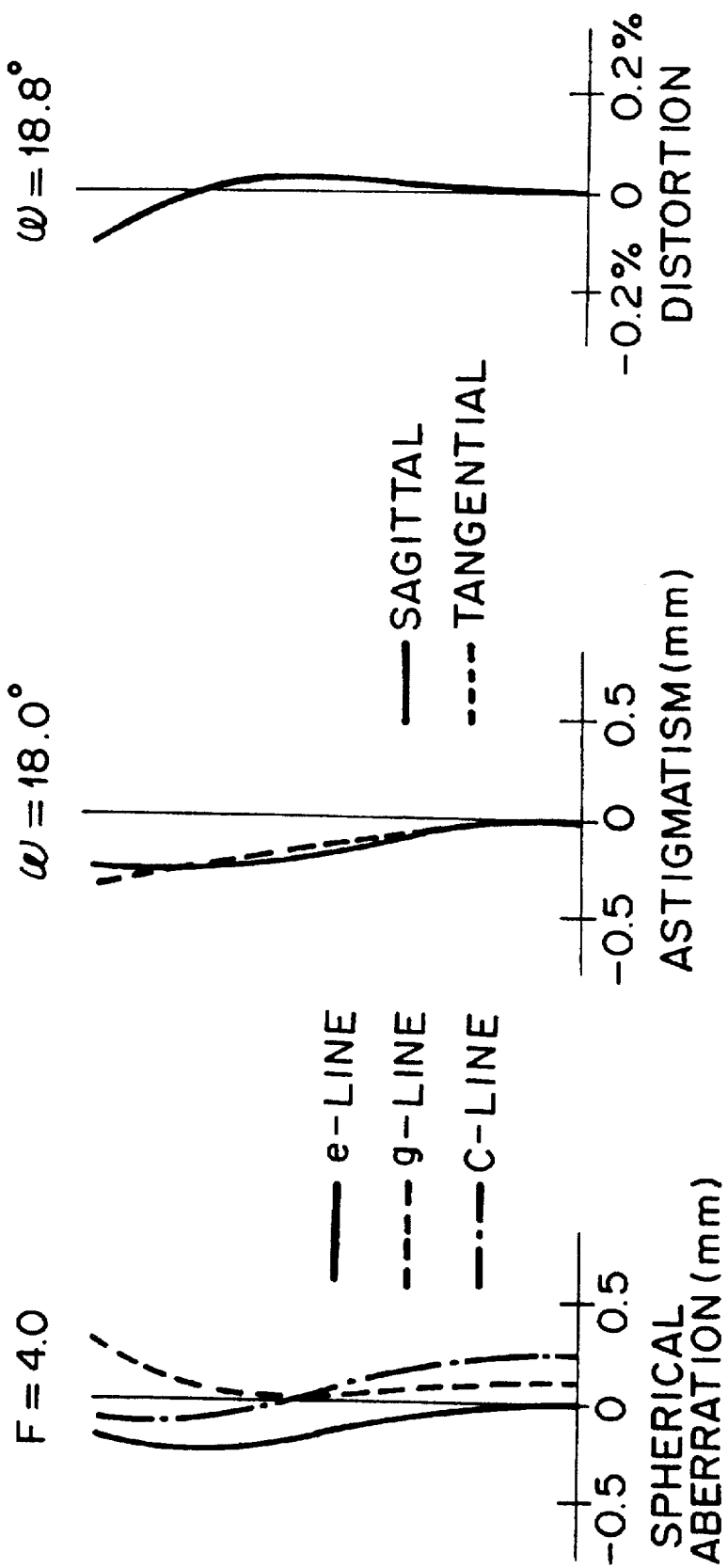

READOUT LENS

RELATED APPLICATIONS

This application claims the priority of Japanese Patent Application No. 7-284553 filed on Oct. 5, 1995, which is incorporated herein by reference.

BACKGROUND OF THE INVENTION

1. Field of the Invention

The present invention relates to an imaging lens used in an optical system of an image readout apparatus such as facsimile machine or image scanner and, in particular, to a readout lens for reducing or enlarging images.

2. Description of the Prior Art

For an imaging lens used for reading out an image in a facsimile machine, an image scanner, or the like which is of a type forming an image of an original image onto an image pickup device such as CCD in a reduced or enlarged state, it has been basically required to have a high resolution at the imaging magnification used, a large peripheral light quantity, and a low distortion. Additionally, together with the recent demand for attaining a compact size and a low cost in the optical apparatus as a whole, it has been required to have a compact size and a low manufacturing cost.

As an imaging lens which can respond to such requirements, there has been known, for example, a compact imaging lens of four-sheet configuration disclosed in Japanese Unexamined Patent Publication No. 7-104185.

The four-sheet imaging lens disclosed in the above-mentioned publication can shorten the length of the whole lens system while attaining a favorable quality in the readout image. When used in a line sensor of a copying machine or the like, however, there has been an increasing demand for reading out images with a wider angle due to necessity for attaining a compact size or the like. Thus, readout lenses with a wider field have been required. Further, there has been a demand for attaining a readout lens brighter than that disclosed in the above-mentioned publication.

SUMMARY OF THE INVENTION

In view of such a circumstance, the object of the present invention is to provide a bright readout lens which is composed of four sheets of lenses, can attain a wide field angle, and can yield a favorable quality of readout images at a low cost.

The readout lens in accordance with the present invention comprises, successively from the object side, a first lens comprising a positive meniscus lens with a convex surface directed onto the object side, a second lens comprising a biconcave lens, a third lens comprising a biconvex lens, and a fourth lens comprising a negative meniscus lens with a convex surface directed onto the imaging surface side, while satisfying the following conditional expressions (1) to (3):

$$0.87 < f(1/R_8 - 1/R_7) < 2.75 \quad (1)$$

$$0.23 < R_1/f < 0.38 \quad (2)$$

$$1.08 < |N_4 f_4|/f < 3.70 \quad (3)$$

wherein f is composite focal length of the lens system as a whole;
$f_4$ is focal length of the fourth lens;
$R_i$ radius of curvature of i-th surface; and
$N_4$ is refractive index of the fourth lens with respect to e-line.

Also, the readout lens in accordance with the present invention may further comprise a stop inserted between the second and third lenses.

Here, when the first to fourth lenses are successively disposed from the object side in the above-mentioned order, the readout lens in accordance with the present invention can be used as an image-reducing lens; whereas, when the first to fourth lenses are successively disposed from the imaging surface side in the above-mentioned order, the readout lens can be used as an image-enlarging lens.

BRIEF DESCRIPTION OF THE DRAWINGS

FIG. 4 is an aberration chart (spherical aberration, astigmatism, and distortion of the lens in accordance with Embodiment 2;

FIG. 6 is an aberration chart (spherical aberration, astigmatism, and distortion) of the lens in accordance with Embodiment 3;

FIG. 10 is an aberration chart (spherical aberration, astigmatism, and distortion) of the lens in accordance with Embodiment 5;

FIG. 14 is an aberration chart (spherical aberration, astigmatism, and distortion) of the lens in accordance with Embodiment 7;

DETAILED DESCRIPTION OF THE PREFERRED EMBODIMENTS

In the following, embodiments of the present invention will be explained with reference to drawings.

Figure 1:
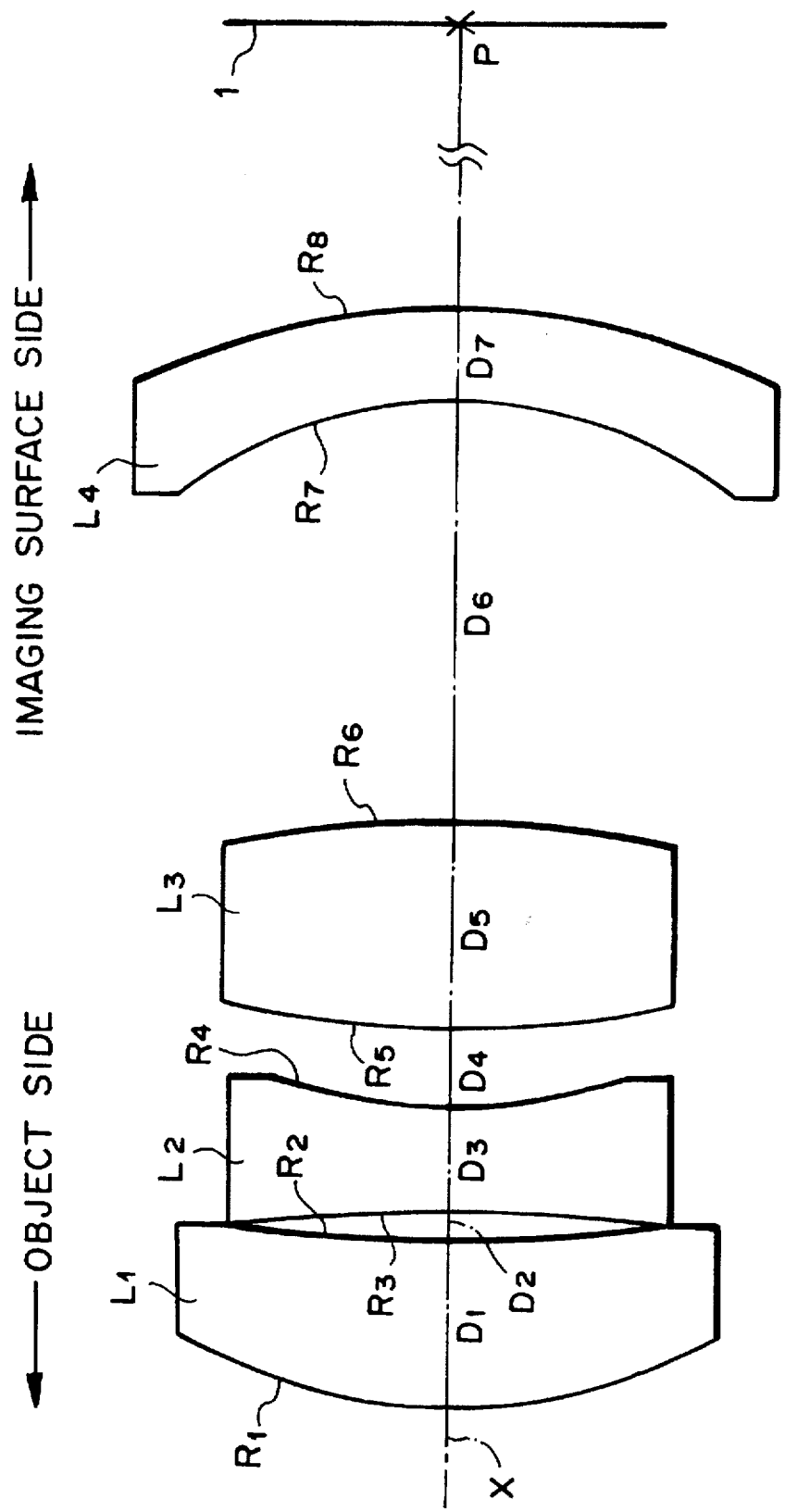
FIG. 1 is a schematic view showing a basic lens configuration in accordance with Embodiments 1 to 8 of the present invention.
Figures 2A, 2B, 2C:
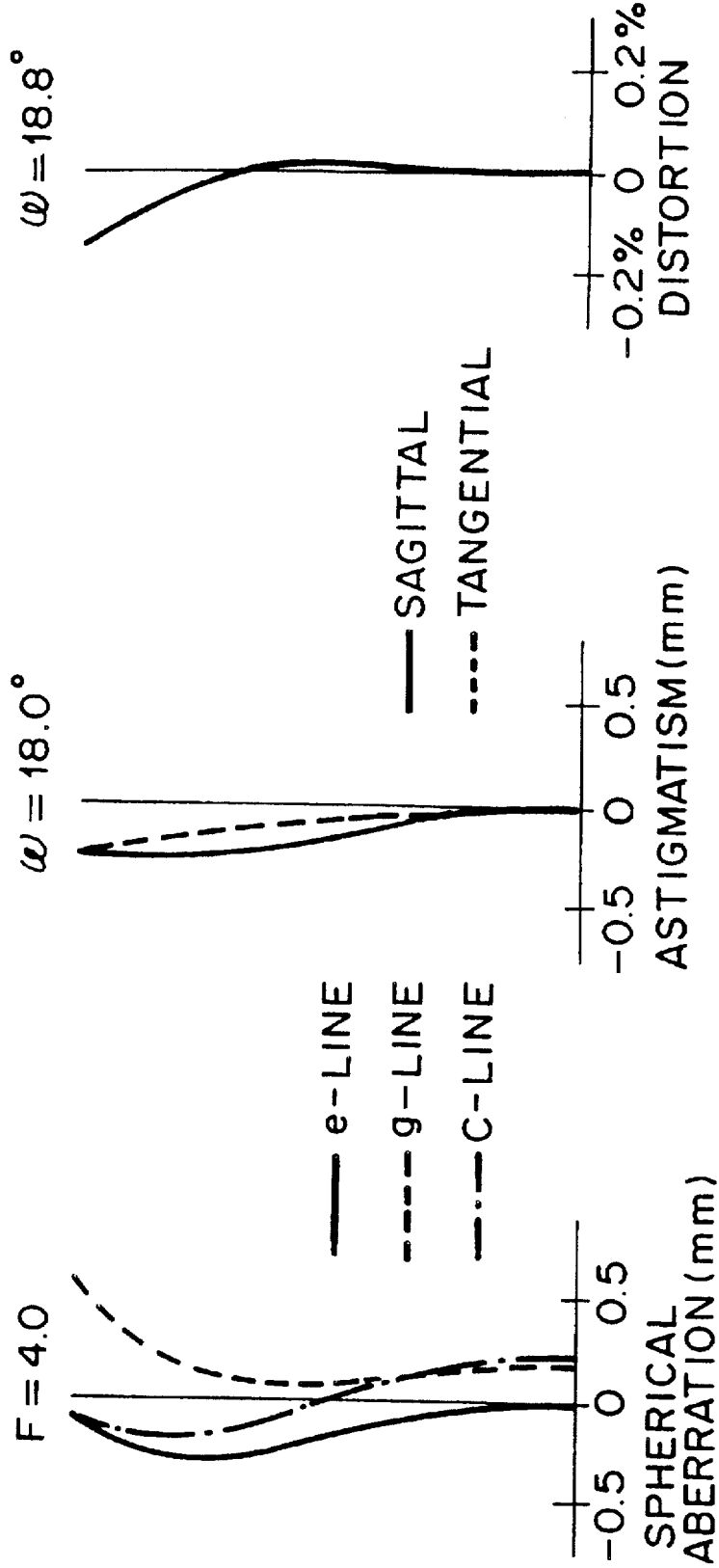
FIG. 2 is an aberration chart (spherical aberration, astigmatism, and distortion) the lens in accordance with Embodiment 1.
Figure 3A:
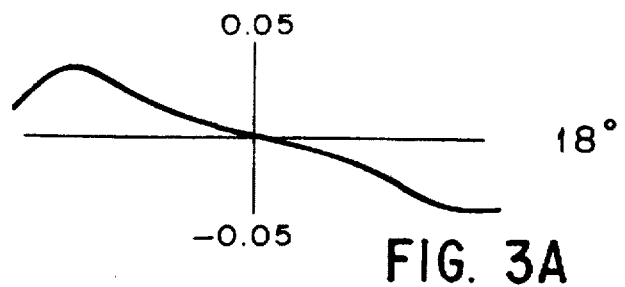
FIG. 3 is an aberration chart (coma) of the lens in accordance with Embodiment 1.
Figure 3B:
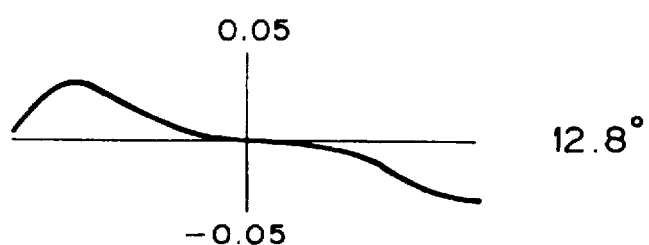
Figure 3C:
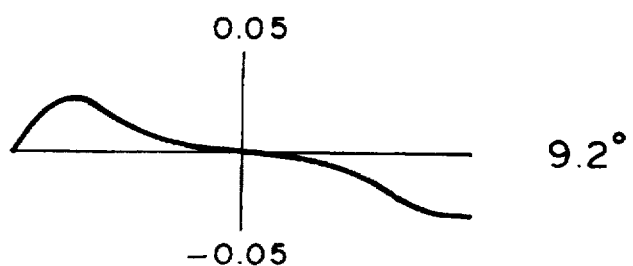
Figure 3D:
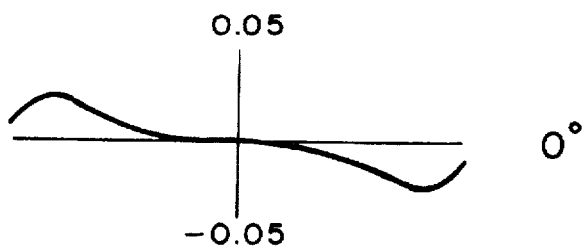
Figure 5A:
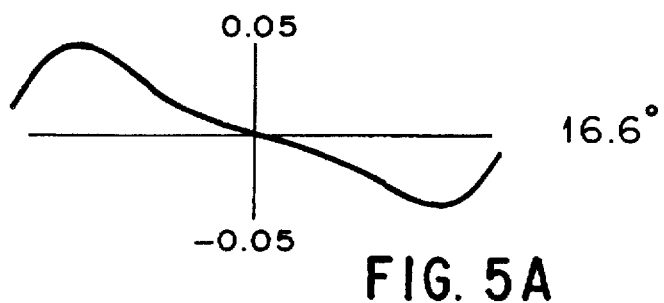
FIG. 5 is an aberration chart (coma) of the lens in accordance with Embodiment 2.
Figure 5B:
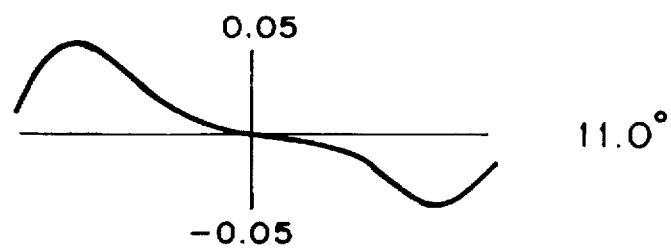
Figure 5C:
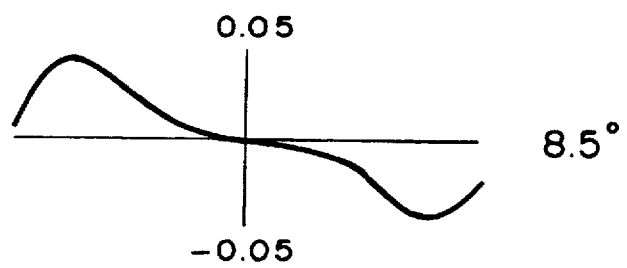
Figure 5D:
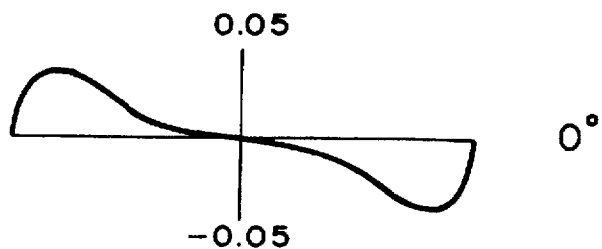
Figure 7A:
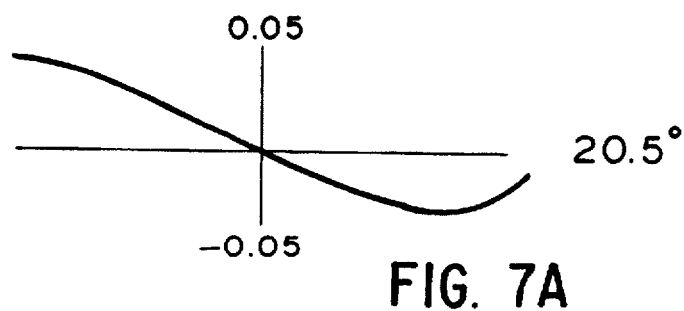
FIG. 7 is an aberration chart (coma) of the lens in accordance with Embodiment 3.
Figure 7B:
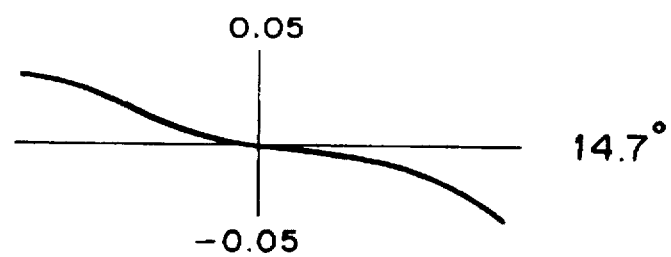
Figure 7C:
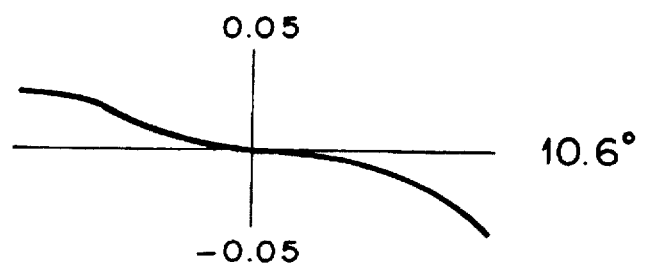
Figure 7D:
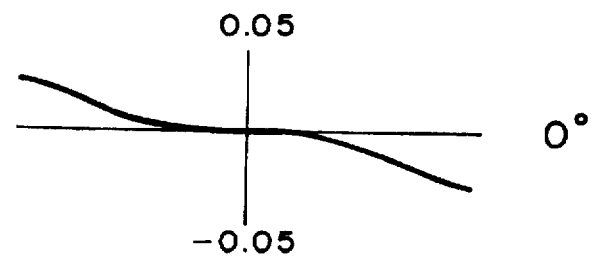
Figures 8A, 8B, 8C:
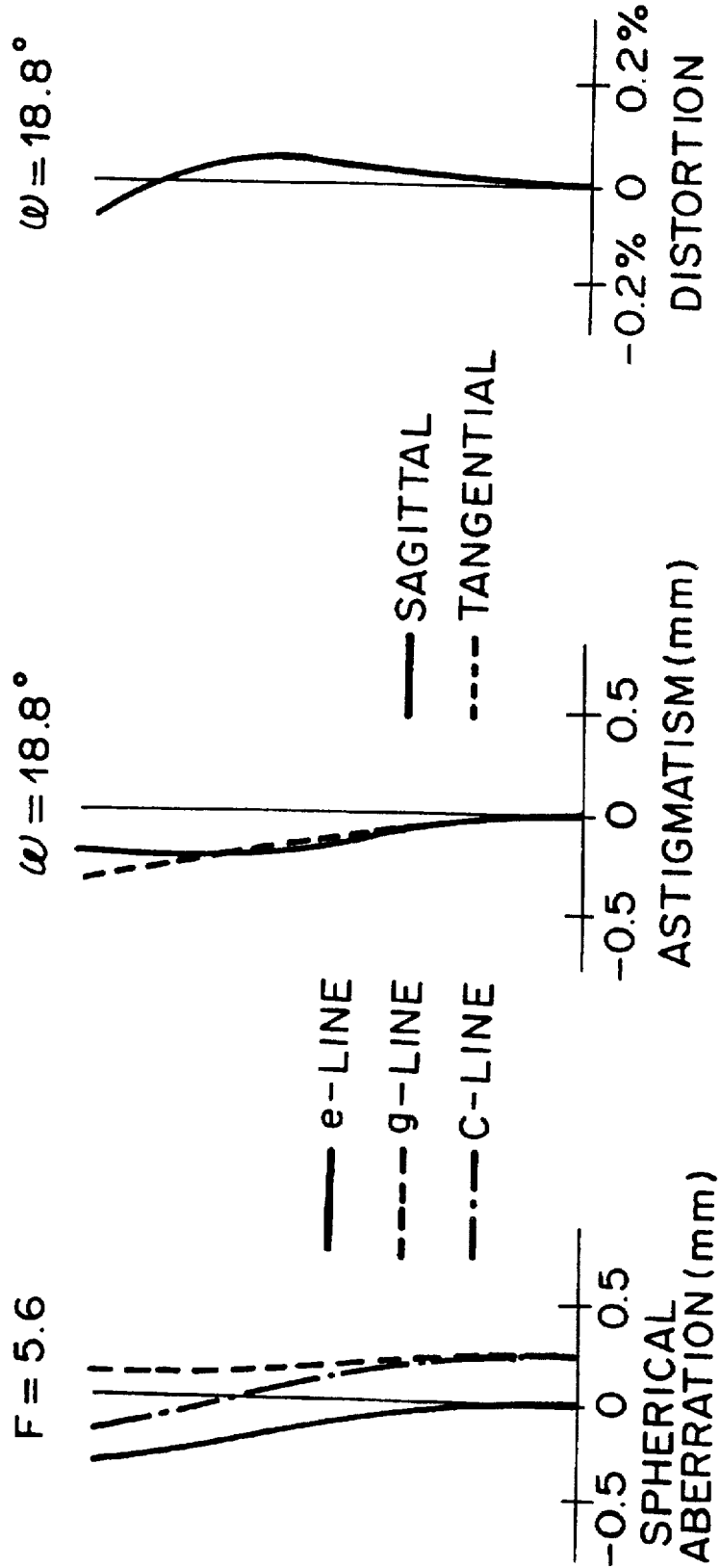
FIG. 8 is an aberration chart (spherical aberration, astigmatism, and distortion) of the lens in accordance with Embodiment 4.
Figure 9A:
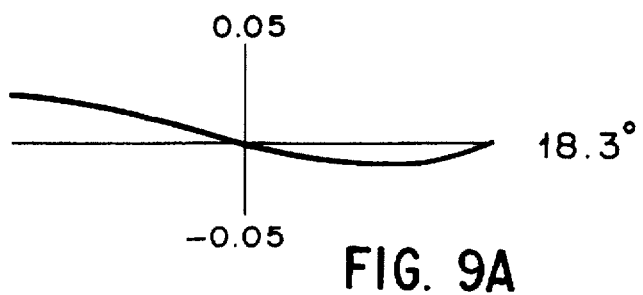
FIG. 9 is an aberration chart (coma) of the lens in accordance with Embodiment 4.
Figure 9B:
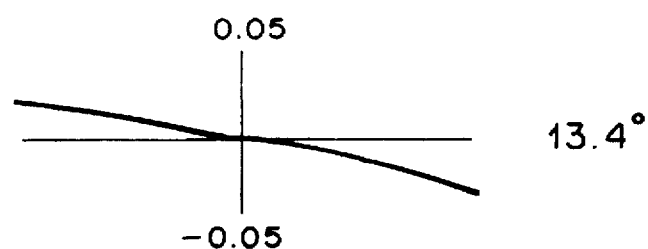
Figure 9C:
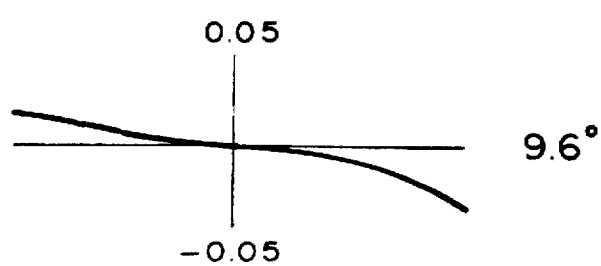
Figure 9D:
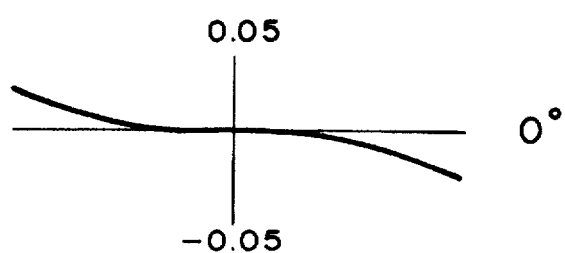
Figure 11A:
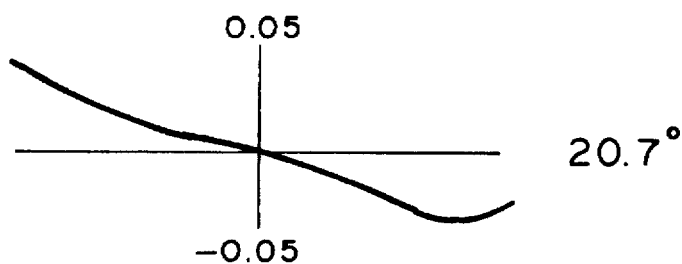
FIG. 11 is an aberration chart (coma) of the lens in accordance with Embodiment 5.
Figure 11B:
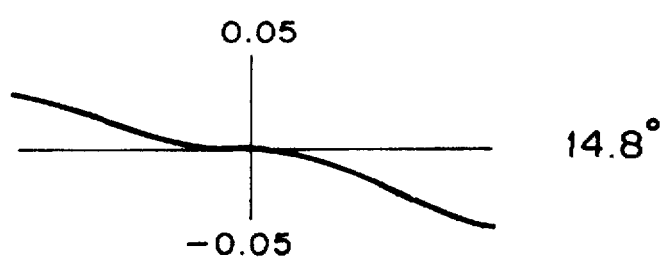
Figure 11C:
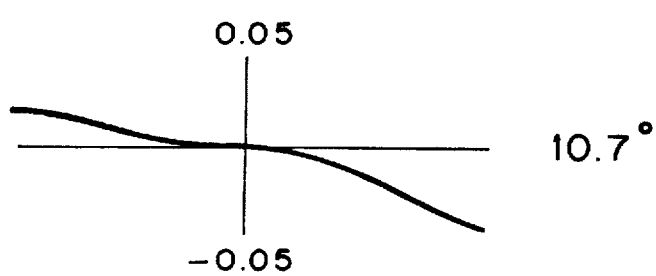
Figure 11D:
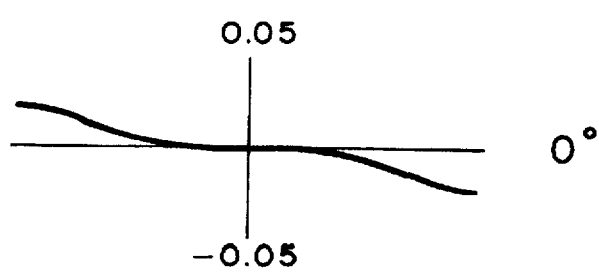
Figures 12A, 12B, 12C:
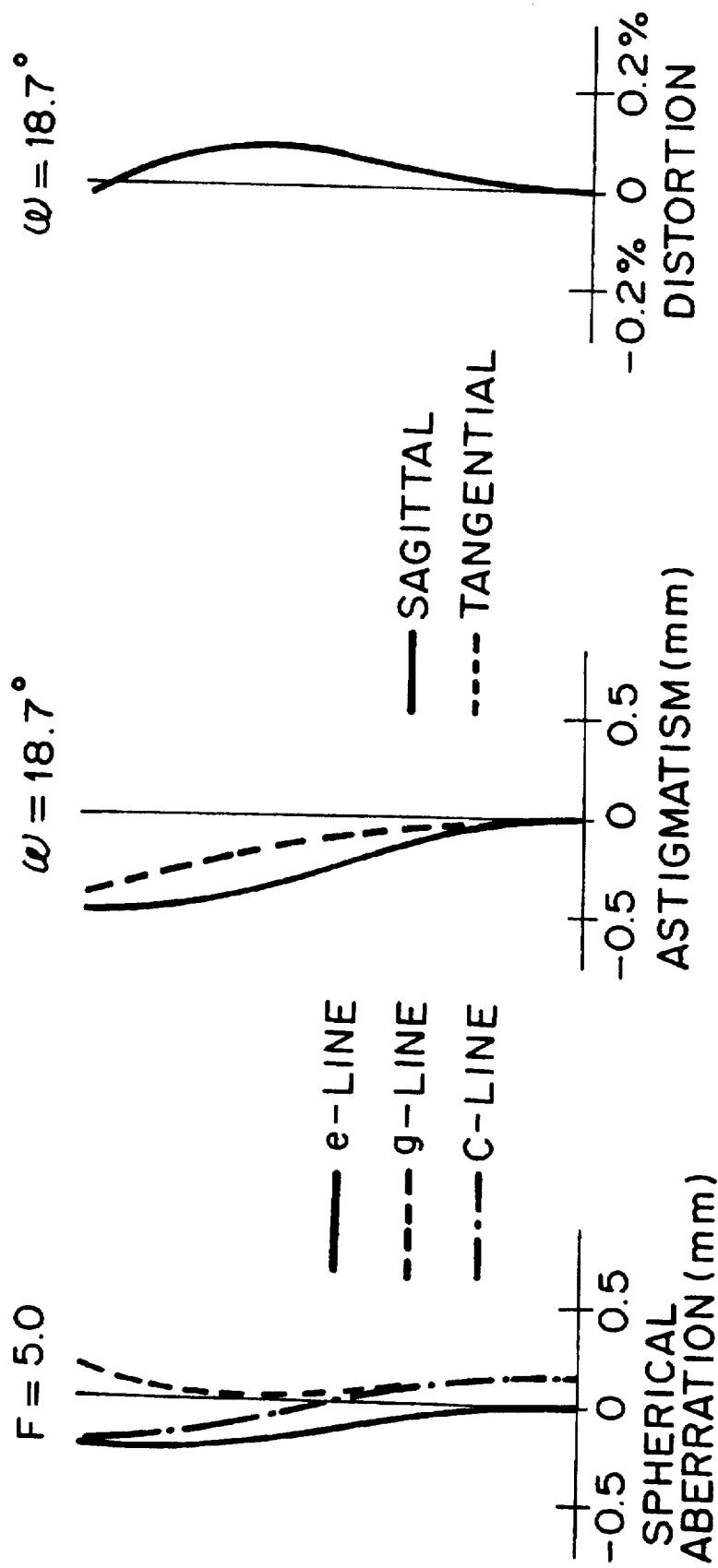
FIG. 12 is an aberration chart (spherical aberration, astigmatism, and distortion) of the lens in accordance with Embodiment 6.
Figure 13A:
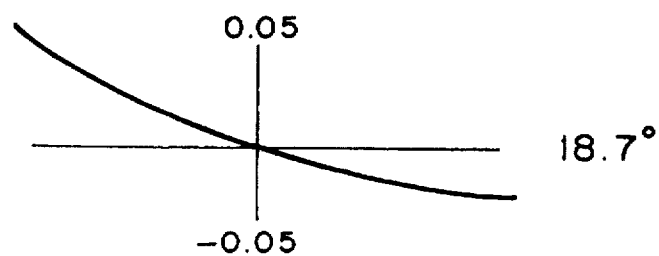
FIG. 13 is an aberration chart (coma) of the lens in accordance with Embodiment 6.
Figure 13B:
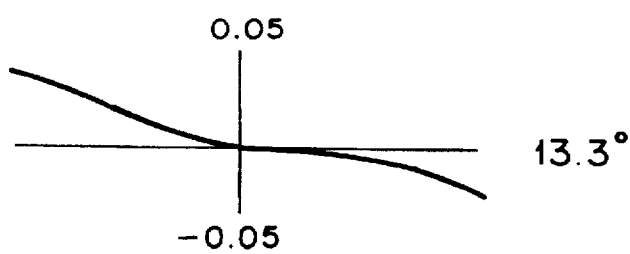
Figure 13C:
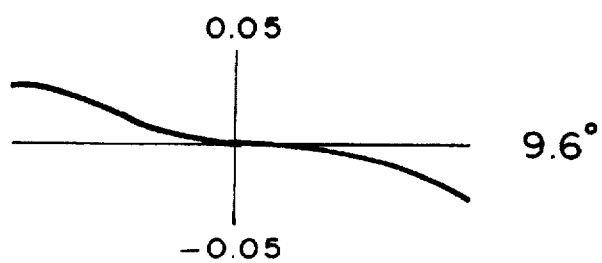
Figure 13D:
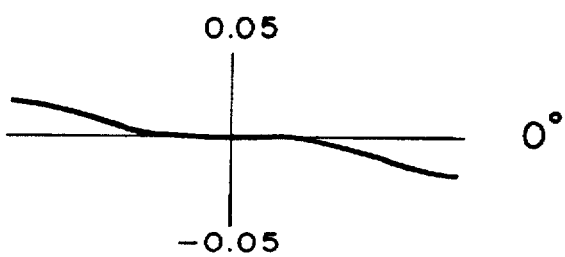
Figure 15A:
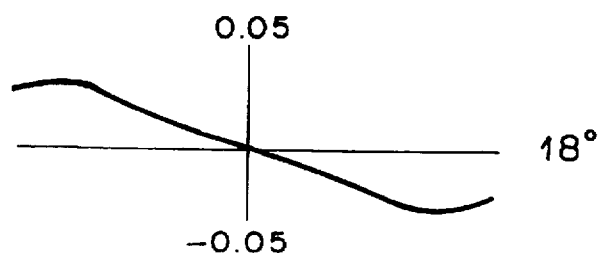
FIG. 15 is an aberration chart (coma) of the lens in accordance with Embodiment 7.
Figure 15B:
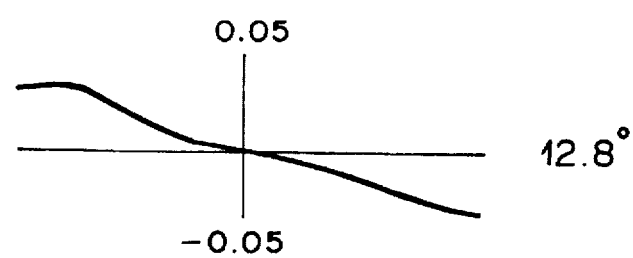
Figure 15C:
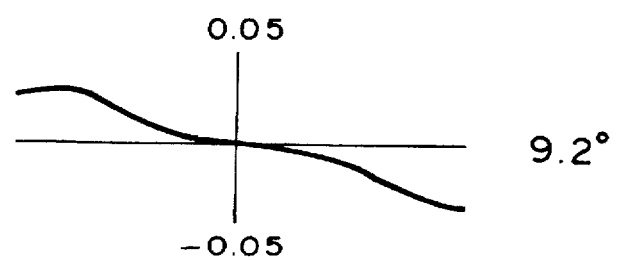
Figure 15D:
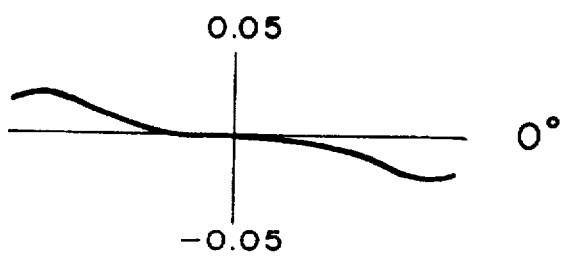
Figures 16A, 16B, 16C:
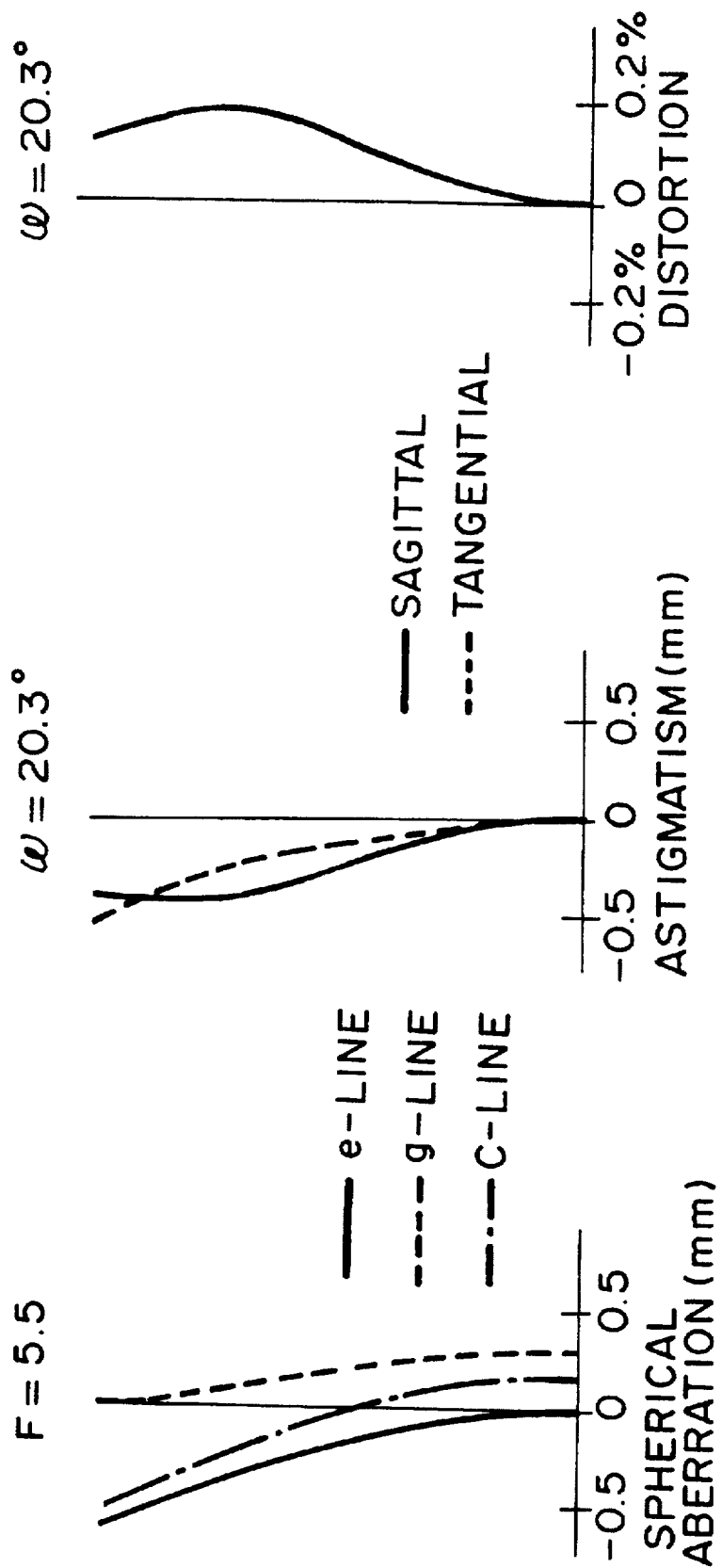
FIG. 16 is an aberration chart (spherical aberration, astigmatism, and distortion) of the lens in accordance with Embodiment 8.
Figure 17A:
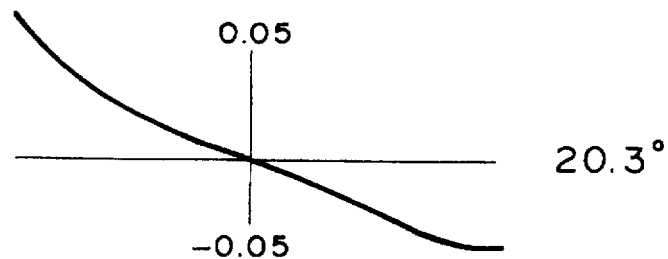
FIG. 17 is an aberration chart (coma) of the lens in accordance with Embodiment 8.
Figure 17B:
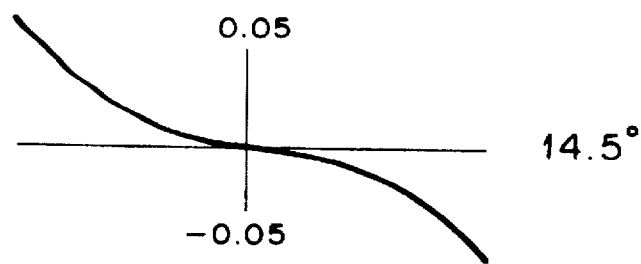
Figure 17C:
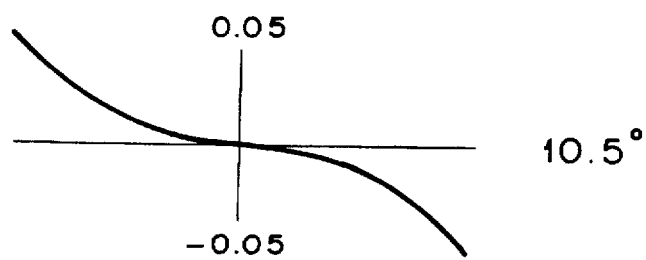
Figure 17D:
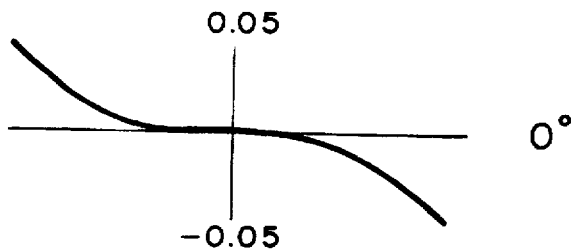

Here, FIG. 1 shows a basic lens configuration of Embodiments 1 to 8. As shown in FIG. 1, the imaging lens (readout lens) for reading out images in accordance with these embodiments is constituted by four sheets of lenses $L_1$ to $L_4$, while a stop i is disposed between the second lens $L_2$ and third lens $L_3$, whereby a luminous flux incident on the readout lens from the object side along an optical axis X forms an image at an imaging position P.

Here, the first lens $L_1$ is a positive meniscus lens having a convex surface directed onto the object side, the second lens $L_2$ is a biconcave lens having a surface with a stronger curvature directed onto the imaging surface side, the third lens $L_3$ is a biconvex lens with both surfaces having curvatures identical to each other, and a fourth lens $L_4$ is a negative meniscus lens having a convex surface directed onto the imaging surface side.

Also, these lenses satisfy the following conditional expressions (1) to (3):

$$0.87 < f(1/R_8 - 1/R_7) < 2.75 \quad (1)$$

$$0.23 < R_1/f < 0.38 \quad (2)$$

$$1.08 < |N_4 \cdot f_4|/f < 3.70 \quad (3)$$

wherein f is composite focal length of the lens system as a whole;

$f_4$ is focal length of the fourth lens;

$R_i$ radius of curvature of i-th surface; and $N_4$ is refractive index of the fourth lens with respect to e-line.

In this readout lens, the positive first lens $L_1$, the negative second lens $L_2$, the positive third lens $L_3$, and the negative fourth lens $L_4$ are successively disposed from the object side. Since each of the pair of the first and second lenses and the pair of the third and fourth lenses is formed by positive and negative lenses, aberration generated by the lens on the front side can be corrected, before it becomes large, by the lens on the rear side. Accordingly, aberration can be efficiently corrected.

In the following, the above-mentioned conditional expressions (1) to (3) will be explained.

The above-mentioned conditional expression (1) is a conditional expression defining the range of distance between the curvatures of both sides of the fourth lens $L_4$ ($1/R_8 - 1/R_7$) with respect to the composite focal length f of the whole lens system. Below the lower limit of this range, distortion increases. Further, above the upper limit and below the lower limit thereof, it becomes difficult to favorably correct coma.

Accordingly, distortion and coma can be made favorable when this conditional expression (1) is satisfied.

The above-mentioned conditional expression (2) is a conditional expression concerning the power of the first lens $L_1$, which defines the range of ratio $R_1/f$, i.e., the radius of curvature $R_1$ of the first surface of the first lens $L_1$ to the composite focal length f of the whole lens system. Above the upper limit of this range, though it is advantageous in correcting aberration, the whole lens length becomes so large that it is against the demand for attaining a compact lens system. Below the lower limit, by contrast, the image surface tilts toward the lens so much that astigmatism may increase.

Accordingly, when this conditional expression (2) is satisfied, the lens system can attain a compact size while making astigmatism favorable.

The above-mentioned conditional expression (3) defines the range of the ratio of product of the refractive index $N_4$ and focal length $f_4$ of the fourth lens $L_4$ to the composite focal length f of the whole lens system. Above the upper limit of this range, distortion becomes large. Also, outside of this range, it becomes difficult to correct coma.

Accordingly, distortion and coma can be favorably corrected when this conditional expression (3) is satisfied.

In the following, each of Embodiments 1 to 8 will be explained with reference to their specific values.

EMBODIMENT 1

Table 1 (follows) shows radius of curvature R (mm) of each lens surface, center thickness of each lens and air gap between neighboring lenses D (mm), and refractive index N and Abbe number ν of each lens at e-line in Embodiment 1.

Here, in Table 1 as well as in Tables 2 to 8 which will be shown later, the reference numbers corresponding to each of the marks R, D, N, and ν successively increase from the object side.

Also, the middle portion of Table 1 shows values of the focal length f, F number, half field angle ω, and imaging magnification β of the whole lens system in the readout lens of this embodiment.

Further, the lower portion of Table 1 shows values in this embodiment respectively corresponding to the above-mentioned conditional expressions (1) to (3).

As can be seen from this table, each of conditional expressions (1) to (3) is satisfied in this embodiment. Also, wideness of the field angle and brightness are made sufficient for a readout lens.

EMBODIMENT 2

Table 2 (follows) shows radius of curvature R (mm) of each lens surface, center thickness of each lens and air gap between neighboring lenses D (mm), and refractive index N and Abbe number ν of each lens at e-line in Embodiment 2.

Also, the middle portion of Table 2 shows values of the focal length f, F number, half field angle ω, and imaging magnification β of the whole lens system in the readout lens of this embodiment.

Further, the lower portion of Table 2 shows values in this embodiment respectively corresponding to the above-mentioned conditional expressions (1) to (3).

As can be seen from this table, each of conditional expressions (1) to (3) is satisfied in this embodiment. Also, wideness of the field angle and brightness are made sufficient for a readout lens.

EMBODIMENT 3

Table 3 (follows) shows radius of curvature R (mm) of each lens surface, center thickness of each lens and air gap between neighboring lenses D (mm), and refractive index N and Abbe number ν of each lens at e-line in Embodiment 3.

Also, the middle portion of Table 3 shows values of the focal length f, F number, half field angle ω, and imaging magnification β of the whole lens system in the readout lens of this embodiment.

Further, the lower portion of Table 3 shows values in this embodiment respectively corresponding to the above-mentioned conditional expressions (1) to (3).

As can be seen from this table, each of conditional expressions (1) to (3) is satisfied in this embodiment. Also, wideness of the field angle and brightness are made sufficient for a readout lens.

EMBODIMENT 4

Table 4 (follows) shows radius of curvature R (mm) of each lens surface, center thickness of each lens and air gap between neighboring lenses D (mm), and refractive index N and Abbe number ν of each lens at e-line in Embodiment 4.

Also, the middle portion of Table 4 shows values of the focal length f, F number, half field angle ω, and imaging magnification β of the whole lens system in the readout lens of this embodiment.

Further, the lower portion of Table 4 shows values in this embodiment respectively corresponding to the above-mentioned conditional expressions (1) to (3).

As can be seen from this table, each of conditional expressions (1) to (3) is satisfied in this embodiment. Also, wideness of the field angle and brightness are made sufficient for a readout lens.

EMBODIMENT 5

Table 5 (follows) shows radius of curvature R (mm) of each lens surface, center thickness of each lens and air gap between neighboring lenses D (mm), and refractive index N and Abbe number ν of each lens at e-line in Embodiment 5.

Also, the middle portion of Table 5 shows values of the focal length f, F number, half field angle ω, and imaging magnification β of the whole lens system in the readout lens of this embodiment.

Further, the lower portion of Table 5 shows values in this embodiment respectively corresponding to the above-mentioned conditional expressions (1) to (3).

As can be seen from this table, each of conditional expressions (1) to (3) is satisfied in this embodiment. Also, wideness of the field angle and brightness are made sufficient for a readout lens.

EMBODIMENT 6

Table 6 (follows) shows radius of curvature R (mm) of each lens surface, center thickness of each lens and air gap between neighboring lenses D (mm), and refractive index N and Abbe number ν of each lens at e-line in Embodiment 6.

Also, the middle portion of Table 6 shows values of the focal length f, F number, half field angle ω, and imaging magnification β of the whole lens system in the readout lens of this embodiment.

Further, the lower portion of Table 6 shows values in this embodiment respectively corresponding to the above-mentioned conditional expressions (1) to (3).

As can be seen from this table, each of conditional expressions (1) to (3) is satisfied in this embodiment. Also, wideness of the field angle and brightness are mades sufficient for a readout lens.

EMBODIMENT 7

Table 7 (follows) shows radius of curvature R (mm) of each lens surface, center thickness of each lens and air gap between neighboring lenses D (mm), and refractive index N and Abbe number ν of each lens at e-line in Embodiment 7.

Also, the middle portion of Table 7 shows values of the focal length f, F number, half field angle ω, and imaging magnification β of the whole lens system in the readout lens of this embodiment.

Further, the lower portion of Table 7 shows values in this embodiment respectively corresponding to the above-mentioned conditional expressions (1) to (3).

As can be seen from this table, each of conditional expressions (1) to (3) is satisfied in this embodiment. Also, wideness of the field angle and brightness are made sufficient for a readout lens.

EMBODIMENT 8

Table 8 (follows) shows radius of curvature R (mm) of each lens surface, center thickness of each lens and air gap between neighboring lenses D (mm), and refractive index N and Abbe number ν of each lens at e-line in Embodiment 8.

Also, the middle portion of Table 8 shows values of the focal length f, F number, half field angle ω, and imaging magnification β of the whole lens system in the readout lens of this embodiment.

Further, the lower portion of Table 8 shows values in this embodiment respectively corresponding to the above-mentioned conditional expressions (1) to (3).

As can be seen from this table, each of conditional expressions (1) to (3) is satisfied in this embodiment. Also, wideness of the field angle and brightness are made sufficient for a readout lens.

FIGS. 2, 4, 6, 8, 10, 12, 14, and 16 are aberration charts (aberration charts for spherical aberration, astigmatism, and distortion) respectively corresponding to Embodiments 1 to 8. In these charts, ω indicates the half field angle. Also, FIGS. 3, 5, 7, 9, 11, 13, 15, and 17 are aberration charts showing coma, which respectively correspond to Embodiments 1 to 8.

As can be seen from FIGS. 2 to 17, all the above-mentioned various kinds of aberration can be made favorable in the above-mentioned embodiments.

Here, each spherical aberration chart shows aberrations with respect to e-line, g-line, and C-line. Also, each astigmatism chart shows the respective aberrations with respect to the sagittal (S) image surface and the tangential (T) image surface.

Without being restricted to the foregoing embodiments, the readout lens of the present invention can be modified in various manners. For example, the radius of curvature R and lens spacing (or lens thickness) D can be appropriately changed.

As explained in the foregoing, the readout lens of the present invention is configured such that the length of the whole lens system is made short with a wide field angle while care is taken in order to prevent various kinds of aberration from deteriorating. Accordingly, the lens system can attain a compact size and a wider field angle while favorably correcting various kinds of aberration. Also, this readout lens can be made as a bright lens system.

TABLE 1

| Surface No. | R | D | N | ν |
|---|---|---|---|---|
| 1 | 33.231 | 10.28 | 1.77621 | 49.6 |
| 2 | 89.234 | 2.03 | | |
| 3 | −101.19 | 6.18 | 1.76168 | 27.5 |
| 4 | 37.354 | 4.67 | | |
| 5 | 64.425 | 12.33 | 1.80983 | 39.6 |
| 6 | −64.425 | 25.60 | | |
| 7 | −28.332 | 5.52 | 1.63004 | 35.6 |
| 8 | −44.558 | | | |

| Focal length f of whole lens system | 100 mm |
|---|---|
| FNO | 4.0 |
| Half field angle ω | 18° |
| Imaging magnification β | −0.110 |

| Values of expression | | |
|---|---|---|
| | Conditional expression | Value |
| (1) | $f(1/R_8 - 1/R_7)$ | 1.285 |
| (2) | $R_1/f$ | 0.332 |
| (3) | $|N_4 \cdot f_4|/f$ | 2.318 |

TABLE 2

| Surface No. | R | D | N | ν |
|---|---|---|---|---|
| 1 | 34.897 | 7.84 | 1.77621 | 49.6 |
| 2 | 107.70 | 2.43 | | |
| 3 | −100.16 | 5.34 | 1.76168 | 27.5 |
| 4 | 41.345 | 6.13 | | |
| 5 | 67.864 | 14.99 | 1.80922 | 39.6 |
| 6 | −67.864 | 28.35 | | |
| 7 | −28.031 | 3.24 | 1.63004 | 35.6 |
| 8 | −48.082 | | | |

| | |
|---|---|
| Focal length f of whole lens system | 100 mm |
| FNO | 3.5 |
| Half field angle ω | 16.6° |
| Imaging magnification β | −0.110 |

Values of expression

| Conditional expression | Value |
|---|---|
| (1) $f(1/R_8 - 1/R_7)$ | 1.488 |
| (2) $R_1/f$ | 0.349 |
| (3) $|N_4 \cdot f_4|/f$ | 1.855 |

TABLE 3

| Surface No. | R | D | N | ν |
|---|---|---|---|---|
| 1 | 26.521 | 12.13 | 1.65142 | 53.0 |
| 2 | 83.195 | 1.94 | | |
| 3 | −108.29 | 3.46 | 1.76168 | 27.5 |
| 4 | 34.603 | 4.46 | | |
| 5 | 50.846 | 14.88 | 1.72794 | 38.0 |
| 6 | −50.846 | 9.80 | | |
| 7 | −22.057 | 3.29 | 1.59262 | 41.0 |
| 8 | −43.415 | | | |

| | |
|---|---|
| Focal length f of whole lens system | 100 mm |
| FNO | 5.0 |
| Half field angle ω | 20.5° |
| Imaging magnification β | −0.083 |

Values of expression

| Conditional expression | Value |
|---|---|
| (1) $f(1/R_8 - 1/R_7)$ | 2.230 |
| (2) $R_1/f$ | 0.265 |
| (3) $|N_4 \cdot f_4|/f$ | 1.278 |

TABLE 4

| Surface No. | R | D | N | ν |
|---|---|---|---|---|
| 1 | 32.875 | 4.87 | 1.77621 | 49.6 |
| 2 | 101.57 | 1.67 | | |
| 3 | −99.033 | 6.42 | 1.76168 | 27.5 |
| 4 | 44.222 | 7.38 | | |
| 5 | 71.793 | 9.75 | 1.80983 | 39.6 |
| 6 | −71.793 | 29.96 | | |
| 7 | −2.403 | 3.46 | 1.63004 | 3.6 |
| 8 | −43.940 | | | |

| | |
|---|---|
| Focal length f of whole lens system | 100 mm |
| FNO | 5.6 |
| Half field angle ω | 18.8° |
| Imaging magnification β | −0.165 |

Values of expression

| Conditional expression | Value |
|---|---|
| (1) $f(1/R_8 - 1/R_7)$ | 1.661 |
| (2) $R_1/f$ | 0.329 |
| (3) $|N_4 \cdot f_4|/f$ | 1.679 |

TABLE 5

| Surface No. | R | D | N | ν |
|---|---|---|---|---|
| 1 | 31.181 | 12.00 | 1.77621 | 49.6 |
| 2 | 62.719 | 2.46 | | |
| 3 | −97.056 | 2.44 | 1.76168 | 27.5 |
| 4 | 40.256 | 4.13 | | |
| 5 | 65.749 | 11.61 | 1.80983 | 39.6 |
| 6 | −65.749 | 18.83 | | |
| 7 | −21.947 | 2.89 | 1.63004 | 35.6 |
| 8 | −27.907 | | | |

| | |
|---|---|
| Focal length f of whole lens system | 100 mm |
| FNO | 5.0 |
| Half field angle ω | 20.7° |
| Imaging magnification β | −0.110 |

Values of expression

| Conditional expression | Value |
|---|---|
| (1) $f(1/R_8 - 1/R_7)$ | 0.973 |
| (2) $R_1/f$ | 0.312 |
| (3) $|N_4 \cdot f_4|/f$ | 3.271 |

TABLE 6

| Surface No. | R | D | N | ν |
|---|---|---|---|---|
| 1 | 26.465 | 10.53 | 1.65142 | 53.0 |
| 2 | 94.634 | 1.60 | | |
| 3 | −107.62 | 6.09 | 1.76168 | 27.5 |
| 4 | 32.760 | 3.92 | | |
| 5 | 48.243 | 13.74 | 1.72794 | 38.0 |
| 6 | −48.243 | 10.38 | | |
| 7 | −22.344 | 6.19 | 1.59262 | 41.0 |
| 8 | −49.732 | | | |

| | |
|---|---|
| Focal length f of whole lens system | 100 mm |
| FNO | 5.0 |
| Half field angle ω | 18.7° |
| Imaging magnification β | −0.124 |

Values of expression

| Conditional expression | Value |
|---|---|
| (1) $f(1/R_8 - 1/R_7)$ | 2.465 |
| (2) $R_1/f$ | 0.265 |
| (3) $|N_4 \cdot f_4|/f$ | 1.190 |

TABLE 7

| Surface No. | R | D | N | ν |
|---|---|---|---|---|
| 1 | 34.298 | 10.38 | 1.77621 | 49.6 |
| 2 | 104.53 | 1.79 | | |
| 3 | −103.24 | 6.54 | 1.76168 | 27.5 |
| 4 | 39.592 | 5.22 | | |
| 5 | 66.485 | 13.07 | 1.80983 | 39.6 |
| 6 | −66.485 | 24.41 | | |
| 7 | −27.630 | 6.47 | 1.63004 | 35.6 |
| 8 | −46.820 | | | |

| | |
|---|---|
| Focal length f of whole lens system | 100 mm |
| FNO | 4.0 |
| Half field angle ω | 18° |
| Imaging magnification β | −0.110 |

Values of expression

| Conditional expression | Value |
|---|---|
| (1) $f(1/R_8 - 1/R_7)$ | 1.483 |
| (2) $R_1/f$ | 0.343 |
| (3) $|N_4 \cdot f_4|/f$ | 2.005 |

TABLE 8

| Surface No. | R | D | N | ν |
|---|---|---|---|---|
| 1 | 26.721 | 9.74 | 1.65142 | 53.0 |
| 2 | 89.627 | 1.89 | | |
| 3 | −98.735 | 5.01 | 1.76168 | 27.5 |
| 4 | 36.629 | 4.67 | | |
| 5 | 51.378 | 13.65 | 1.72794 | 38.0 |
| 6 | −51.378 | 12.73 | | |
| 7 | −21.830 | 3.06 | 1.59262 | 41.0 |
| 8 | −45.580 | | | |

| | |
|---|---|
| Focal length f of whole lens system | 100 mm |
| FNO | 5.5 |
| Half field angle ω | 20.3° |
| Imaging magnification β | −0.083 |

| Values of expression | |
|---|---|
| Conditional expression | Value |
| (1) f(1/R$_8$ − 1/R$_7$) | 2.387 |
| (2) R$_1$/f | 0.267 |
| (3) |N$_4$ · f$_4$|/f | 1.183 |

What is claimed is:

1. A readout lens comprising, successively from an object side, a first lens comprising a positive meniscus lens with a convex surface directed onto the object side, a second lens comprising a biconcave lens, a third lens comprising a biconvex lens, and a fourth lens comprising a negative meniscus lens with a convex surface directed onto an imaging surface side, wherein the following conditional expressions (1) to (3) are satisfied:

$$0.87 < f(1/R_8 - 1/R_7) < 2.75 \tag{1}$$

$$0.23 < R_1/f < 0.38 \tag{2}$$

$$1.08 < |N_4 \cdot f_4|/f < 3.70 \tag{3}$$

wherein f is composite focal length of the lens system as a whole;

f$_4$ is focal length of the fourth lens;

R$_i$ radius of curvature of i-th surface; and

N$_4$ is refractive index of the fourth lens with respect to e-line.

2. A readout lens according to claim 1, further comprising a stop disposed between said second lens and third lens.

* * * * *

UNITED STATES PATENT AND TRADEMARK OFFICE
CERTIFICATE OF CORRECTION

PATENT NO. : 5,900,994
DATED : May 4, 1999
INVENTOR(S): Ryoko Otomo, et al

It is certified that error appears in the above-identified patent and that said Letters Patent is hereby corrected as shown below:

Column 10, line 19, delete "$R_l$" and insert --$R_i$--.

Signed and Sealed this

Twenty-first Day of September, 1999

Attest:

Q. TODD DICKINSON

*Attesting Officer*  *Acting Commissioner of Patents and Trademarks*